(12) United States Patent
Stein et al.

(10) Patent No.: US 8,776,510 B2
(45) Date of Patent: Jul. 15, 2014

(54) MOUNTING UNIT FOR FASTENING AN INJECTION MEMBER TO AN EXHAUST GAS TRACT

(75) Inventors: Stefan Stein, Stuttgart (DE); Arnad Beganovic, Stuttgart-Weilimdorf (DE); Ralf Gragen, Esslingen (DE); Jens Benitsch, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 195 days.

(21) Appl. No.: 13/384,620

(22) PCT Filed: Jun. 2, 2010

(86) PCT No.: PCT/EP2010/057694
§ 371 (c)(1),
(2), (4) Date: Jan. 18, 2012

(87) PCT Pub. No.: WO2011/012359
PCT Pub. Date: Feb. 3, 2011

(65) Prior Publication Data
US 2012/0110990 A1 May 10, 2012

(30) Foreign Application Priority Data
Jul. 27, 2009 (DE) .................. 10 2009 028 030

(51) Int. Cl.
*F01N 1/00* (2006.01)
*F01N 3/00* (2006.01)
*F01N 3/02* (2006.01)
*F01N 3/20* (2006.01)
*B05B 15/02* (2006.01)
*F23D 11/34* (2006.01)
*F23D 11/38* (2006.01)
*F23D 14/50* (2006.01)

(52) U.S. Cl.
USPC ............. 60/324; 239/106; 239/107; 239/108; 239/112; 239/431; 239/434

(58) Field of Classification Search
USPC ............ 60/310, 324; 239/112, 108, 107, 106, 239/431, 434
See application file for complete search history.

(56) References Cited

U.S. PATENT DOCUMENTS 5,605,042 A * 2/1997 Stutzenberger ................. 60/286
6,279,603 B1 * 8/2001 Czarnik et al. ................. 137/339

(Continued)

FOREIGN PATENT DOCUMENTS

JP 2005351245 12/2005
JP 2007315313 12/2007

(Continued)

OTHER PUBLICATIONS

International Search Report for PCT/EP2010/057694, dated Jul. 15, 2010, 2 pages.

*Primary Examiner* — Thomas Denion
*Assistant Examiner* — Dapinder Singh
(74) *Attorney, Agent, or Firm* — Michael Best & Friedrich LLP

(57) ABSTRACT

A mounting unit (2) for fastening an injection member to an exhaust gas tract has a retaining region (12) for receiving the injection member, and an edge region (28). At least one opening (30) for receiving a fastening element is provided in the edge region (28). The mounting unit (2) is designed in such a manner that there is an air gap (13) between the fastening element and the retaining region (12) when the mounting unit (2) is fastened to the exhaust gas tract by the fastening element.

20 Claims, 1 Drawing Sheet

(56) References Cited

U.S. PATENT DOCUMENTS

| | | | |
|---|---|---|---|
| 7,168,241 B2 * | 1/2007 | Rudelt et al. | 60/286 |
| 7,614,213 B2 | 11/2009 | Hirata et al. | |
| 7,849,682 B2 * | 12/2010 | Miller et al. | 60/303 |
| 8,453,436 B2 * | 6/2013 | Gaudin et al. | 60/295 |
| 2002/0001554 A1 * | 1/2002 | Czarnik et al. | 423/235 |
| 2004/0020475 A1 * | 2/2004 | Hashimoto et al. | 123/514 |
| 2006/0191595 A1 * | 8/2006 | Stoffel | 144/136.95 |
| 2009/0211237 A1 | 8/2009 | Blomquist et al. | |
| 2009/0217650 A1 | 9/2009 | Haeberer et al. | |
| 2009/0242666 A1 * | 10/2009 | Li | 239/394 |

FOREIGN PATENT DOCUMENTS

| | | |
|---|---|---|
| JP | 2008240552 | 10/2008 |
| WO | 2008040363 | 4/2008 |
| WO | 2008046681 | 4/2008 |

* cited by examiner

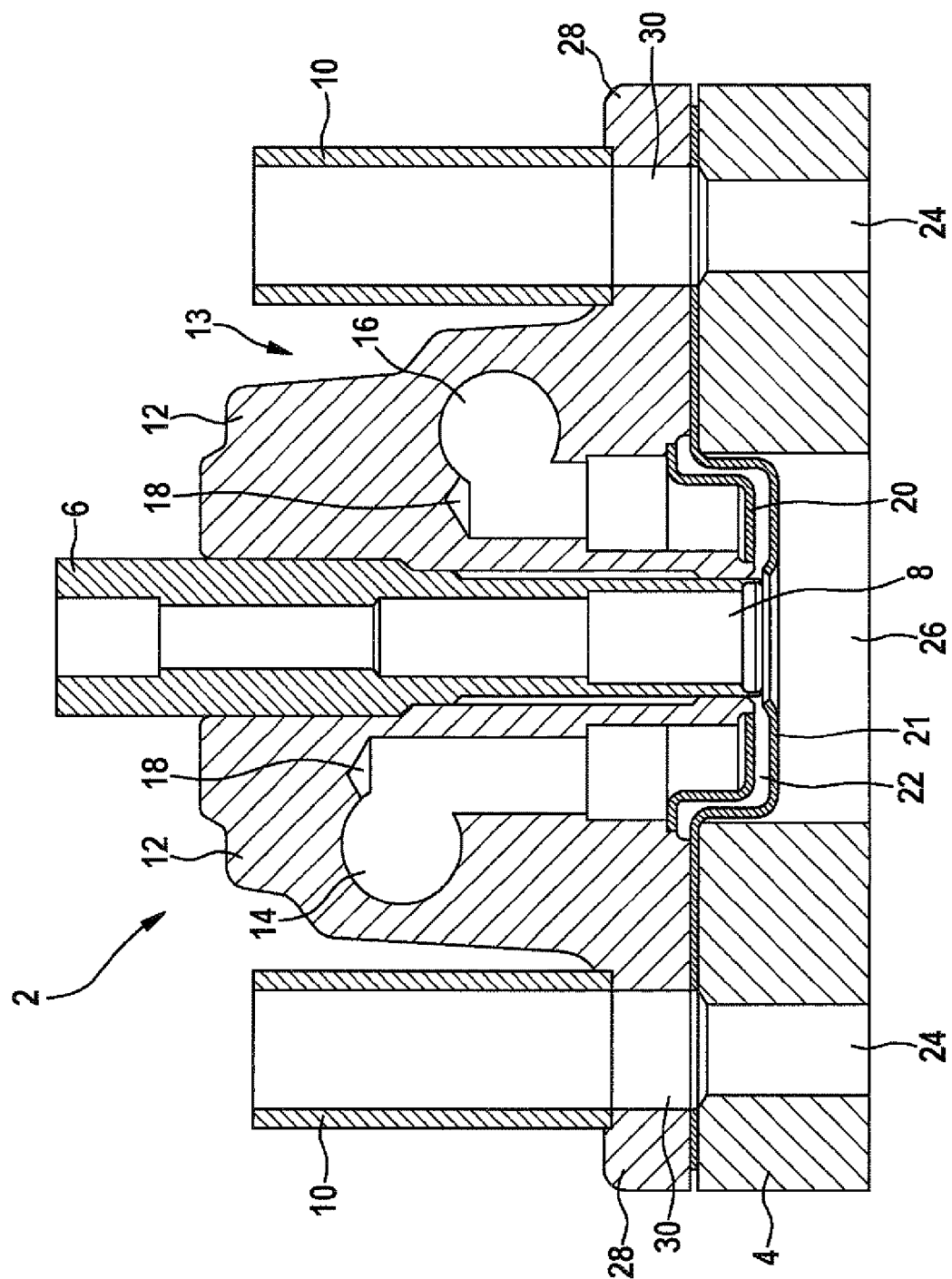

MOUNTING UNIT FOR FASTENING AN INJECTION MEMBER TO AN EXHAUST GAS TRACT

BACKGROUND OF THE INVENTION

The present invention relates to a mounting unit for fastening an injection member for dosing a fluid into an exhaust system of an internal combustion engine on an exhaust tract, and to an exhaust-gas aftertreatment arrangement having a mounting unit of said type.

It is known to install a particle filter in an exhaust system of an internal combustion engine of a vehicle. If the internal combustion engine is a diesel engine, the particle filter acts for example as a soot filter and, owing to its filtering action, reduces the emissions of fine dust. To prevent the filter becoming blocked after a certain operating duration, it is necessary for the filter to be regenerated from time to time. The regeneration takes place by means of a temperature increase to for example approximately 600 degrees Celsius, as a result of which the particles, in particular soot particles, are burned. Since this is not possible by engine-internal measures in all operating situations, the temperature increase is realized by means of fuel, for example diesel, which is injected into the drivetrain via an injection member. The injected fuel passes to an oxidation catalytic converter arranged upstream of the particle filter. The fuel which passes into the oxidation catalytic converter is oxidized or burned and leads to an increase in the exhaust-gas temperature, such that correspondingly hot gases pass to the downstream particle filter and, there, effect the regeneration.

In another method, a urea solution is injected into the exhaust tract for the selective catalytic reduction of nitrogen oxides in exhaust gases in an SCR catalytic converter.

There is therefore a need for a device which makes it possible to inject liquid into an exhaust tract.

A device for introducing a liquid substance into the exhaust gas of an internal combustion engine is described in DE 10 2007 003 120 A1. DE 10 2006 049 531 A1 describes a connecting unit having a port for a dosing module for mounting in an exhaust tract of an internal combustion engine.

During operation, the exhaust line is heated to a high temperature by the hot exhaust gases of the internal combustion engine. The high temperature of the exhaust line is transferred to the injection member. A high temperature at the injection member causes aging of the liquid to be injected, and can thus adversely affect the action of said liquid.

SUMMARY OF THE INVENTION

It is therefore an object of the invention to provide a mounting unit for fastening an injection member to an exhaust line of an internal combustion engine, which mounting unit is designed such that the fluid to be injected is not heated to an excessive degree by hot exhaust gases flowing through the exhaust line before said fluid is injected.

Said object is achieved by means of a mounting unit according to the invention.

A mounting unit according to the invention for fastening an injection member to an exhaust tract has a holding region for receiving the injection member for injecting a fluid, such as for example liquid (diesel) fuel or urea, into the exhaust tract, and has an edge region. At least one opening for receiving a fastening element for fastening the mounting unit to the exhaust tract is provided in the edge region. The mounting unit is designed such that an air gap is formed between the fastening element and the holding region when the mounting unit is fastened to the exhaust tract by means of the fastening element.

To fasten the mounting unit to the exhaust tract, the fastening element is in contact with the exhaust tract. The high temperature of the exhaust tract during operation is thus transmitted to the fastening element. The air gap formed according to the invention thermally insulates the holding region from the fastening element. The heat transfer from the exhaust tract to the holding region is reduced by the thermal insulation. In the vicinity of the injection member, the holding region is at a lower temperature than the exhaust tract and than the fastening element. Aging of the fluid to be injected caused by high temperatures at the injection member is reliably prevented.

The invention also encompasses an exhaust-gas aftertreatment arrangement for injecting a fluid into an exhaust tract, having a mounting unit according to the invention and having an injection member which is designed for injecting the fluid and which is arranged in the holding region of the mounting unit. In one embodiment, the injection member is designed as an injection valve.

In one embodiment of a mounting unit according to the invention, a cooling duct is arranged in the holding region in order to conduct a coolant, in particular water, through the holding region. The temperature in the holding region can be further reduced by means of such a coolant-filled cooling duct.

In a further embodiment, the cooling duct is provided with an inlet and an outlet. Coolant can be conducted into the cooling duct and discharged out of the cooling duct through an inlet and an outlet. The coolant may be cooled in a cooling device provided outside the mounting unit. The temperature in the holding region can be reduced yet further in this way.

In a further embodiment, the cooling duct is closed off, on the side provided for mounting on the exhaust tract, by a cooling plate. The cooling duct is sealed off in a particularly effective manner by means of a cooling plate, and no coolant can escape from the cooling duct into the exhaust tract from the cooling duct.

In one embodiment, the holding region is formed with a bell-shaped profile. A bell-shaped profile of the holding region enables the injection member to be held securely, and at the same time provides an insulating air gap between the fastening element and the holding region. A bell-shaped profile is particularly easy and cheap to produce.

In one embodiment, the opening provided for receiving a fastening element has arranged on it an expansion sleeve, in such a way that the fastening element can be inserted into the opening through the expansion sleeve. The mounting unit is shaped such that an air gap is formed between the expansion sleeve and the holding region when the mounting unit is fastened to the exhaust tract by means of the fastening element. A thermal expansion of the fastening element is compensated for by a corresponding thermal expansion of the expansion sleeve, and a release of the fastening element in the event of thermal heating is reliably prevented. Through the use of an expansion sleeve, the mounting unit can be fastened to the exhaust tract in a particularly secure and reliable manner even under intense temperature fluctuations.

In one embodiment, the expansion sleeve exhibits the same thermal expansion as the mounting unit. A thermal expansion of the holding region is compensated for particularly effectively in this way. In one embodiment, the expansion sleeves and the valve holder are produced substantially from the same material, for example from X5CrNi18-10.

In a further embodiment, the expansion sleeve exhibits the same thermal expansion as the fastening element, for example by virtue of the expansion sleeve being produced from the same material as the fastening element. A thermal expansion of the fastening element is compensated for particularly effectively in this way.

In one embodiment, a bore for receiving the injection member is formed in the holding region. The injection member can be installed in such a bore, and fastened with the mounting unit to the exhaust tract, in a particularly effective, secure and cheap manner.

BRIEF DESCRIPTION OF THE DRAWING

The invention will be explained in more detail below on the basis of the exemplary embodiment shown in the FIGURE.

The FIGURE shows a schematic sectional illustration of a mounting unit 2 according to the invention which is attached to a flange 4 formed on an exhaust tract.

DETAILED DESCRIPTION

The flange 4 is only partially illustrated in the FIGURE, and in the center of the region shown, has an opening 26 through which fluid can be injected into an exhaust-gas duct (not shown in the FIGURE) which runs below the flange 4.

In each case one fastening bore 24 is formed in the flange 4 to the left and to the right of the opening 26, wherein each fastening bore 24 is designed to receive in each case one fastening element (not shown). Each of the fastening bores 24 is for example at least partially formed with an internal thread for receiving and fixing a fastening element, such as for example a threaded bolt or a screw, which is formed with a matching external thread.

A mounting unit 2 according to the invention is attached to the flange 4. The mounting unit 2 has a bell-shaped profile and, in its central region, has a holding region 12 which projects from the flange 4. The holding region 12 is surrounded by a flat edge region 28 which has only a small height or thickness in relation to the holding region 12 and which projects from the flange 4 to a lesser extent than the holding region 12.

In each case one bore 30 for receiving a fastening element (not shown) is formed in the edge regions 28 of the mounting unit 2. The mounting unit 2 is arranged on the flange 4 in such a way that the bores 30 formed in the edge regions 28 of the mounting unit 2 are arranged in each case directly over one of the fastening bores 24 formed in the flange 4. In this way, in each case one fastening element can be inserted into a fastening bore 24 formed in the flange 4 through a bore 30 formed in the respective edge region 28 of the mounting unit 2.

In the exemplary embodiment shown in the FIGURE, in each case one cylindrical expansion sleeve 10 is arranged on each bore 30 on that side of the mounting unit 2 which faces away from the flange 4. In each case one fastening element (not shown in the FIGURE) can be inserted through the expansion sleeves 10 into the bores 30 and 24 arranged one above the other. The material of the expansion sleeves 10 is selected such that the expansion sleeves 10 exhibit a similar or preferably the same thermal expansion as the fastening elements (not shown), such that a thermally induced length expansion of the fastening elements is compensated for by a corresponding length expansion of the associated expansion sleeve 10. This prevents the fastening of the mounting unit 2 to the flange 4 from loosening when the fastening elements expand owing to a temperature increase.

A holding region 12 having a bell-shaped profile is formed between the two flat edge regions 28 of the mounting unit 2. Formed in the center of the holding region 12 is a valve bore which runs parallel to the bores 24, 30 and into which is inserted a valve body 6 of an injection valve with a chamber 8 which is filled with a fluid during operation. The details of the injection valve, such as for example a valve piston, a valve spring or a sealing seat, are not shown in the FIGURE for greater clarity.

When the injection valve is open, a fluid is injected from the fluid-filled chamber 8 into the opening 26, which is arranged below the injection valve, in the flange 4, and said fluid passes from there into an exhaust-gas duct (not shown in the FIGURE) arranged below the opening 26. In the exhaust-gas duct, the injected fluid mixes with the exhaust gas flowing through the exhaust-gas duct.

The holding regions 12 are designed such that an air gap 13 remains between the holding region 12 and the fastening elements, or the expansion sleeves 10 surrounding the fastening elements, when the fastening elements (not shown) have been inserted into the bores 30 and 24, which are arranged one above the other, in order to fasten the mounting unit 2 to the flange 4.

The holding region 12 is thermally insulated with respect to the fastening elements or with respect to the expansion sleeves 10 by the air gap 13. Heat transfer from the flange 4, which is heated during operation by hot exhaust gases, to the holding region 12 via the fastening elements and the expansion sleeves 10 is reduced. During operation, the holding region 12 is at a lower temperature than the flange 4 which is connected to the exhaust tract. The fluid in the fluid-filled chamber 8 is therefore not exposed to high temperatures, and aging of the fluid to be injected is reliably prevented.

A cooling duct 18 is formed in the holding region 12 around the bore which is provided for receiving the valve body 6, through which cooling duct a coolant, such as for example cooling water, flows during operation in order to cool the holding region 12 and to keep the fluid which is situated in the fluid-filled chamber 8 at a low temperature at which aging of the fluid does not occur. The cooling duct 18 is provided with an inlet 16 and an outlet 14 in order to supply coolant from an external cooling device into the cooling duct 18 and in order to discharge the heated coolant out of the cooling duct 18 and supply said heated coolant to an external cooling device. The temperature in the region of the injection valve can be further reduced by means of an external cooling device.

The cooling duct 18 is closed off, on the side facing towards the flange 4, by a valve-side cooling plate 20 such that no coolant flows from the cooling duct 18 into the opening 26 formed in the flange 4. A closed cooling circuit is formed, and coolant losses are reliably prevented.

A sealing unit 21 is arranged between the flange 4 and the mounting unit 2. The sealing unit 21 is of cup-shaped design in the central region of the mounting unit 2 below the injection valve 6, such that in the region of the opening 26 between the exhaust-tract-side sealing unit 21 and the valve-side cooling plate 20, an air gap 22 is formed which thermally insulates the injection valve 6 and the chamber 8, which is filled with fluid during operation, from the hot exhaust gases in the exhaust tract.

Provided in the cup-shaped region of the sealing unit 21 is an injection opening through which the fluid can be injected from the fluid-filled chamber 8 into the exhaust-gas duct through the opening 26 formed in the flange 4.

Outside the opening 26, a flat outer region of the sealing unit 21 is arranged between the flange 4 and the edge regions 28 of the mounting unit 2. The flat outer region of the sealing unit 21 extends beyond the bores 24, 30 provided for receiving the fastening elements, and itself has corresponding openings designed for the passage of fastening elements.

The sealing unit 21, when it is mounted between the mounting unit 2 and the flange 4, is securely fixed by means of the fastening element (not shown), and reliably seals off the interface between the flange 4 and the mounting unit 2, such that neither fluid nor exhaust gases can escape from the exhaust-gas duct via the interface.

The invention claimed is:

1. A mounting unit (2) for fastening an injection member to an exhaust tract, the mounting unit (2) comprising:
   a holding region (12) adapted for receiving an injection member;
   an edge region (28);
   at least one opening (30) provided in the edge region (28) and adapted for receiving a fastening element for fastening the mounting unit (2) to the exhaust; and
   an expansion sleeve (10) positioned on the edge region (28) in alignment with the at least one opening (30) and adapted for receiving the fastening element,
   wherein the mounting unit (2) defines an air gap (13) between the holding region (12) and the expansion sleeve (10), and wherein the expansion sleeve (10) exhibits a thermal expansion the same as the holding region (12).

2. The mounting unit (2) as claimed in claim 1, wherein a cooling duct (18) is formed in the holding region (12).

3. The mounting unit (2) as claimed in claim 2, wherein the cooling duct (18) is provided with an inlet (14) and with an outlet (16).

4. The mounting unit (2) as claimed in claim 2, wherein the cooling duct (18) is delimited, on a side provided for mounting on the exhaust tract, by a cooling plate (20).

5. The mounting unit (2) as claimed in claim 4, wherein a seal (21) is arranged on an outward-facing side of the cooling plate (20).

6. The mounting unit (2) as claimed in claim 1, wherein the holding region (12) is formed with a bell-shaped profile.

7. The mounting unit (2) as claimed in claim 1, wherein a bore (8) adapted for receiving an injection member is formed in the holding region (12).

8. An exhaust-gas aftertreatment arrangement for injecting fluid into an exhaust tract, the exhaust-gas aftertreatment arrangement comprising:
   at least one fastening element;
   a mounting unit (2), wherein the mounting unit (2) has a holding region (12), an edge region (28), and at least one opening (30) provided in the edge region (28), the at least one opening (30) receiving the at least one fastening element for fastening the mounting unit (2) to the exhaust tract;
   an injection member arranged in the holding region (12) of the mounting unit (2);
   an expansion sleeve (10) positioned on the edge region (28) in alignment with the at least one opening (30) and receiving the at least one fastening element; and
   an air gap (13) defined between the holding region (12) and the expansion sleeve (10),
   wherein the expansion sleeve (10) exhibits a thermal expansion the same as the at least one fastening element.

9. The exhaust-gas aftertreatment arrangement as claimed in claim 8, wherein the injection member is an injection valve.

10. The mounting unit (2) as claimed in claim 3, wherein the cooling duct (18) is delimited, on a side provided for mounting on the exhaust tract, by a cooling plate (20).

11. The mounting unit (2) as claimed in claim 10, wherein a seal (21) is arranged on an outward-facing side of the cooling plate (20).

12. The exhaust-gas aftertreatment arrangement as claimed in claim 8, wherein the expansion sleeve (10) exhibits a same thermal expansion as the holding region (12).

13. The exhaust-gas aftertreatment arrangement as claimed in claim 8, wherein a cooling duct (18) is formed in the holding region (12).

14. The exhaust-gas aftertreatment arrangement as claimed in claim 13, wherein the cooling duct (18) is provided with an inlet (14) and with an outlet (16).

15. The exhaust-gas aftertreatment arrangement as claimed in claim 13, wherein the cooling duct (18) is delimited, on a side provided for mounting on the exhaust tract, by a cooling plate (20).

16. The exhaust-gas aftertreatment arrangement as claimed in claim 15, wherein a seal (21) is arranged on an outward-facing side of the cooling plate (20).

17. The exhaust-gas aftertreatment arrangement as claimed in claim 8, wherein the holding region (12) is formed with a bell-shaped profile.

18. The exhaust-gas aftertreatment arrangement as claimed in claim 8, wherein a bore (8) adapted for receiving an injection member is formed in the holding region (12).

19. The exhaust-gas aftertreatment arrangement as claimed in claim 14, wherein the cooling duct (18) is delimited, on a side provided for mounting on the exhaust tract, by a cooling plate (20).

20. The exhaust-gas aftertreatment arrangement as claimed in claim 19, wherein a seal (21) is arranged on an outward-facing side of the cooling plate (20).

* * * * *